US012665757B2

(12) United States Patent
Lipton et al.

(10) Patent No.: US 12,665,757 B2
(45) Date of Patent: Jun. 23, 2026

(54) GENERATING AND MANAGING ENCRYPTED NON-FUNGIBLE TOKENIZED ASSETS

(71) Applicant: NUMERAIRE FINANCIAL, INC., Abu Dhabi (AE)

(72) Inventors: Alexander Lipton, Abu Dhabi (AE); Thomas P. Hardjono, Winchester, MA (US)

(73) Assignee: Numeraire Financial, Inc., Abu Dhabi (AE)

( * ) Notice: Subject to any disclaimer, the term of this patent is extended or adjusted under 35 U.S.C. 154(b) by 176 days.

(21) Appl. No.: 18/701,920

(22) PCT Filed: Sep. 1, 2022

(86) PCT No.: PCT/US2022/042380
§ 371 (c)(1),
(2) Date: Apr. 16, 2024

(87) PCT Pub. No.: WO2023/034527
PCT Pub. Date: Mar. 9, 2023

(65) Prior Publication Data
US 2025/0097026 A1     Mar. 20, 2025

Related U.S. Application Data

(60) Provisional application No. 63/240,648, filed on Sep. 3, 2021.

(51) Int. Cl.
*H04L 29/06*     (2006.01)
*G06F 21/44*     (2013.01)
(Continued)

(52) U.S. Cl.
CPC .............. *H04L 9/088* (2013.01); *G06F 21/44* (2013.01); *G06F 21/64* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,079,682 B2     9/2018  Lu
10,225,076 B2     3/2019  Leng et al.
(Continued)

OTHER PUBLICATIONS

International Search Report and Written Opinion, PCT App. No. PCT/US2022/042380, Jan. 12, 2023, 9 pages., Jan. 12, 2022.
(Continued)

*Primary Examiner* — Andrew J Steinle
(74) *Attorney, Agent, or Firm* — Nicholson De Vos Webster & Elliott LLP

(57)     ABSTRACT

Techniques are described relating to the ownership and management of digital assets that are represented by non-fungible tokens (or "NFTs") on a blockchain. Trusted hardware is used to enable encrypted digital assets to be consumed solely by the owners of the encrypted digital assets and further to enable the transfer of ownership in the digital asset to a new owner using a blockchain. An owner of a digital asset controls access to and consumption of the digital asset via the trusted hardware to which the asset is cryptographically bound. The legal ownership of the digital asset is represented on the blockchain via an NFT. When an NFT changes ownership (e.g., when it is sold to a new owner) on the blockchain, a secure hardware-to-hardware asset transfer protocol is used (off-chain).

20 Claims, 10 Drawing Sheets

(51) Int. Cl.
    *G06F 21/64*      (2013.01)
    *H04L 9/00*       (2022.01)
    *H04L 9/08*       (2006.01)
    *H04L 9/32*       (2006.01)

(56)               References Cited

U.S. PATENT DOCUMENTS

| | | |
|---|---|---|
| 10,839,379 B2 | 11/2020 | Pierce et al. |
| 2020/0272713 A1* | 8/2020 | Black ............... H04L 9/3239 |
| 2021/0329036 A1* | 10/2021 | Cage ............... G06Q 10/067 |

OTHER PUBLICATIONS

International Preliminary Report on Patentability, PCT App. No. PCT/US22/42380, Mar. 14, 2024, 7 pages.

* cited by examiner

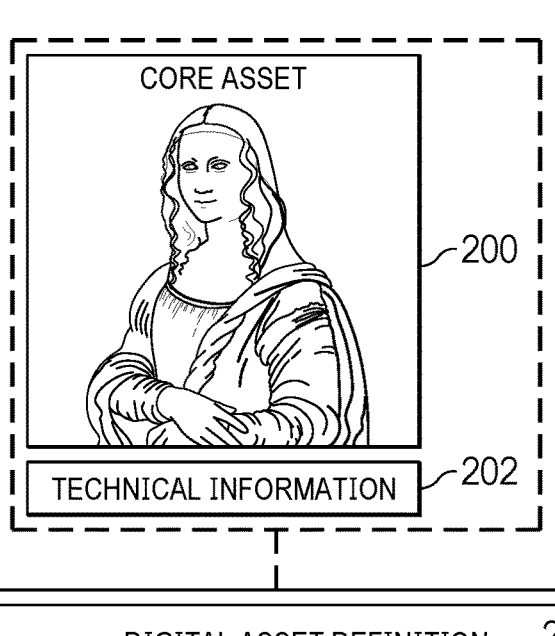

CORE ASSET

TECHNICAL INFORMATION — 202

— 200

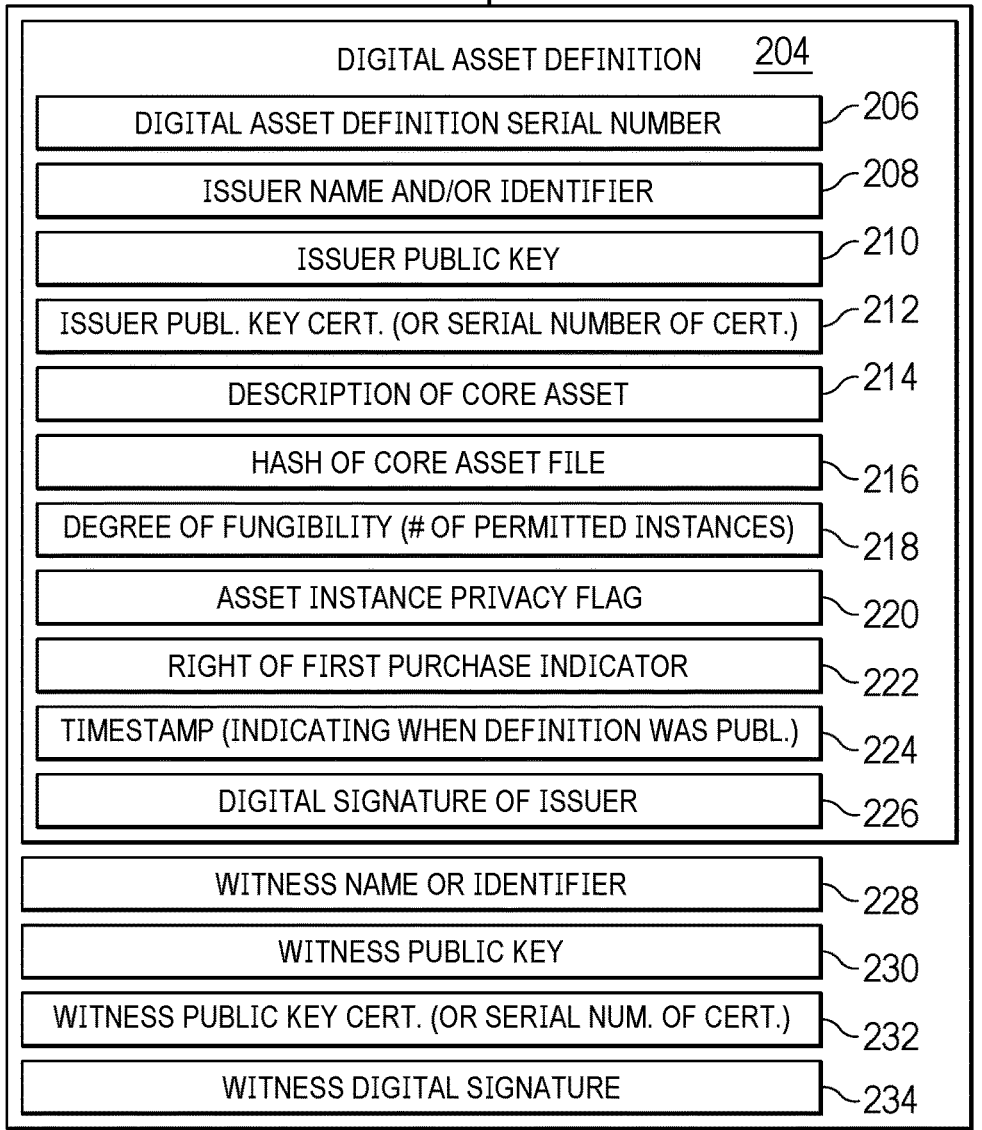

DIGITAL ASSET DEFINITION     204

| DIGITAL ASSET DEFINITION SERIAL NUMBER | — 206 |
| ISSUER NAME AND/OR IDENTIFIER | — 208 |
| ISSUER PUBLIC KEY | — 210 |
| ISSUER PUBL. KEY CERT. (OR SERIAL NUMBER OF CERT.) | — 212 |
| DESCRIPTION OF CORE ASSET | — 214 |
| HASH OF CORE ASSET FILE | — 216 |
| DEGREE OF FUNGIBILITY (# OF PERMITTED INSTANCES) | — 218 |
| ASSET INSTANCE PRIVACY FLAG | — 220 |
| RIGHT OF FIRST PURCHASE INDICATOR | — 222 |
| TIMESTAMP (INDICATING WHEN DEFINITION WAS PUBL.) | — 224 |
| DIGITAL SIGNATURE OF ISSUER | — 226 |

| WITNESS NAME OR IDENTIFIER | — 228 |
| WITNESS PUBLIC KEY | — 230 |
| WITNESS PUBLIC KEY CERT. (OR SERIAL NUM. OF CERT.) | — 232 |
| WITNESS DIGITAL SIGNATURE | — 234 |

FIG. 2

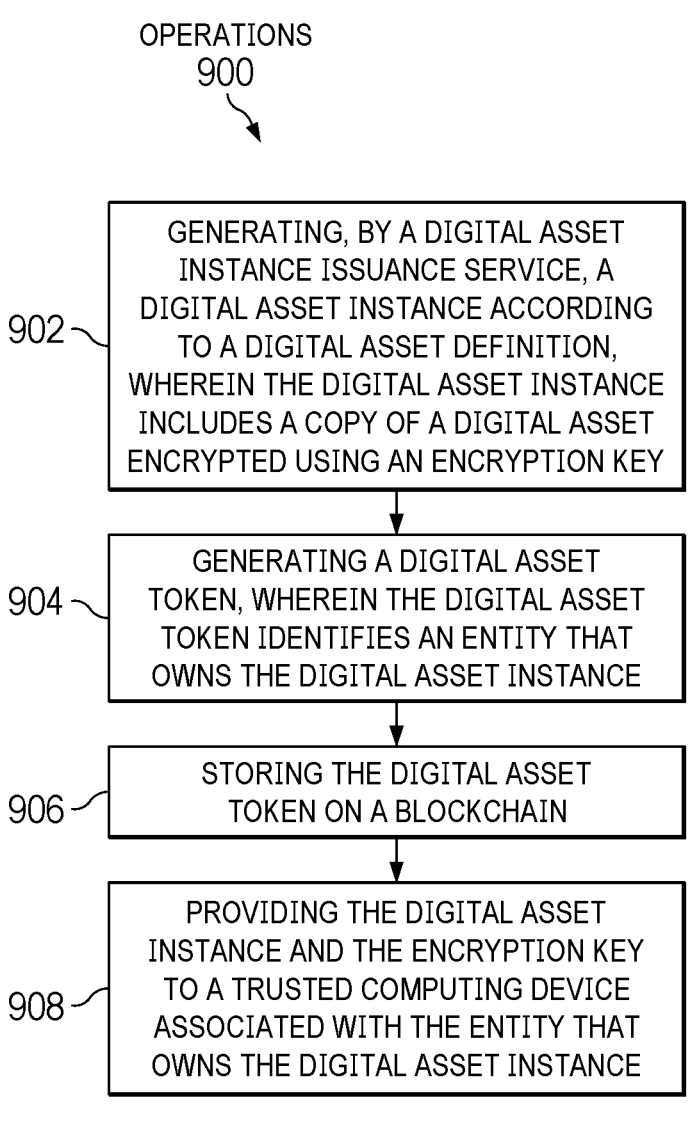

OPERATIONS
900

902 — GENERATING, BY A DIGITAL ASSET INSTANCE ISSUANCE SERVICE, A DIGITAL ASSET INSTANCE ACCORDING TO A DIGITAL ASSET DEFINITION, WHEREIN THE DIGITAL ASSET INSTANCE INCLUDES A COPY OF A DIGITAL ASSET ENCRYPTED USING AN ENCRYPTION KEY

904 — GENERATING A DIGITAL ASSET TOKEN, WHEREIN THE DIGITAL ASSET TOKEN IDENTIFIES AN ENTITY THAT OWNS THE DIGITAL ASSET INSTANCE

906 — STORING THE DIGITAL ASSET TOKEN ON A BLOCKCHAIN

908 — PROVIDING THE DIGITAL ASSET INSTANCE AND THE ENCRYPTION KEY TO A TRUSTED COMPUTING DEVICE ASSOCIATED WITH THE ENTITY THAT OWNS THE DIGITAL ASSET INSTANCE

FIG. 9

GENERATING AND MANAGING ENCRYPTED NON-FUNGIBLE TOKENIZED ASSETS

CROSS-REFERENCE TO RELATED APPLICATION

This application is the national stage of International Application No. PCT/US2022/042380, filed on Sep. 1, 2022, which claims the benefit of U.S. Provisional Application No. 63/240,648, filed on Sep. 3, 2021. The priority applications are hereby incorporated by reference as if fully set forth.

BACKGROUND

A non-fungible token (or "NFT") is a unit of data stored on a digital ledger (e.g., a blockchain) that can be used to represent ownership of a digital asset (e.g., digital art, digital collectibles, etc.) or to otherwise indicate that a digital asset is unique and therefore not interchangeable.

BRIEF DESCRIPTION OF DRAWINGS

Various embodiments in accordance with the present disclosure will be described with reference to the drawings, in which:

FIG. 2 is a diagram illustrating a digital asset definition (or "DAD") corresponding to a core asset according to some examples.

FIG. 9 is a flow diagram illustrating operations of a method for providing a digital asset instance to a trusted computing device associated with an entity that owns the digital asset instance according to some examples.

DETAILED DESCRIPTION

Figure 1:
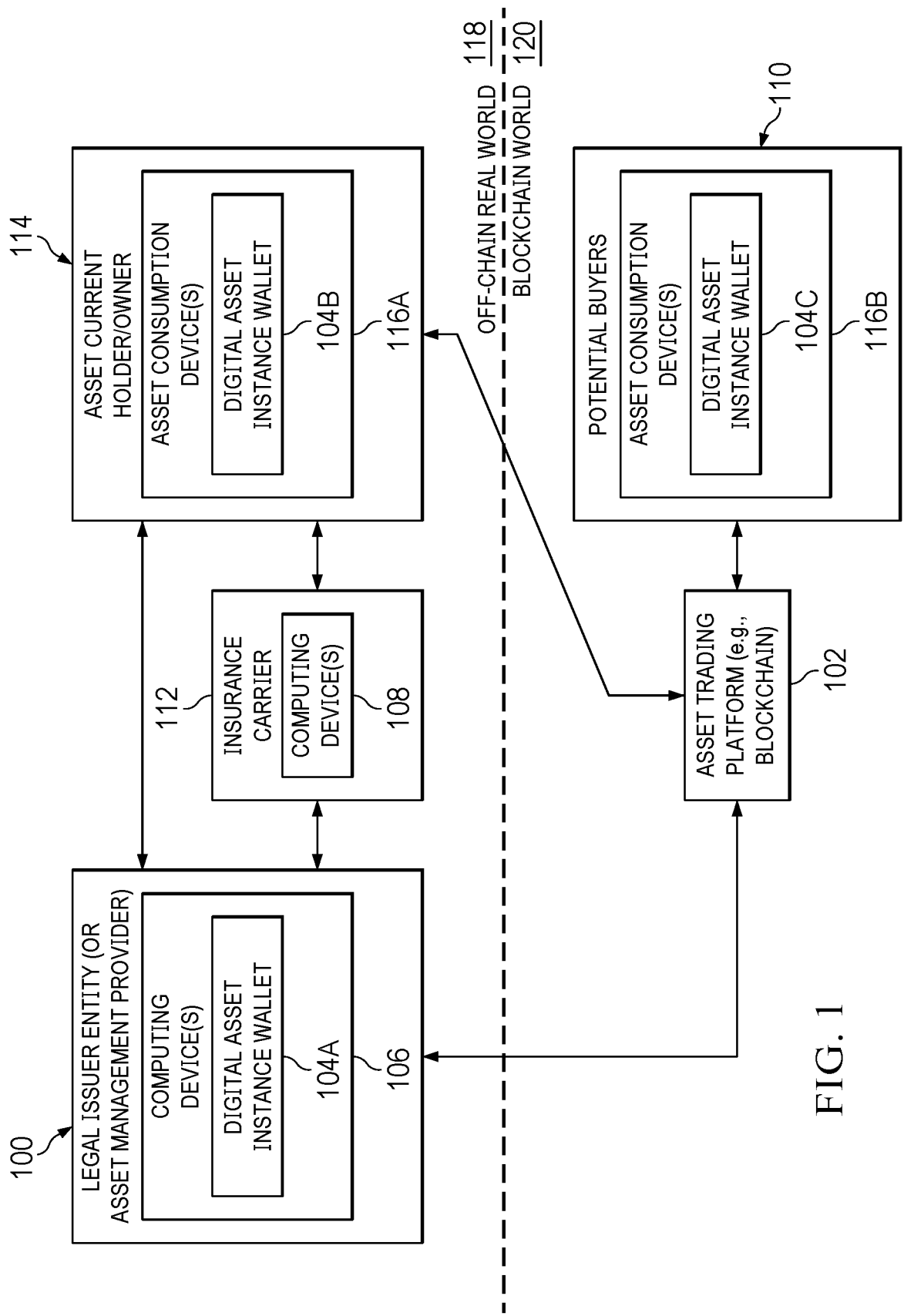
FIG. 1 is a diagram illustrating an overview of the interaction between a legal issuer entity, an asset owner/holder (off-chain), and a blockchain used to exchange ownership of digital asset tokens (or "DATs") representing digital asset instances (or "DAIs") according to some examples.

Various embodiments of methods, apparatus, systems, and non-transitory computer-readable storage media are described relating to the ownership and management of digital assets that are represented by non-fungible tokens (or "NFTs") on a blockchain. According to examples described herein, trusted hardware is used to enable encrypted digital assets to be consumed exclusively by the owners of the encrypted digital assets and further to enable the transfer of ownership in the digital asset to a new owner using a blockchain (e.g., based on the sale and purchase of digital assets or other type of ownership transfers). In some examples, an owner of a digital asset controls access to and consumption of the digital asset via the trusted hardware to which the asset is cryptographically bound. The legal ownership of the digital asset is represented on the blockchain via an NFT. When an NFT changes ownership (e.g., when it is sold to a new owner) on the blockchain, a secure hardware-to-hardware asset transfer protocol is used (off-chain). Among other benefits, the processes described herein improve the ability for a computer-implemented digital asset issuance service to provide access control to a limited number of copies of a digital asset and to ensure that only the current owners of a digital asset can consume a digital asset, thereby improving the security of the digital assets.

According to examples described herein, a digitized non-fungible asset can include the digital representation of a non-fungible (or non-divisible) asset (e.g., digitized land registry paper document, digitized painting from a canvas, etc.). In some examples, a legal issuer entity is a legally registered entity that creates and publishes the definition of the digital version of a physical asset. For example, an identifiable legal issuer entity can help other entities determine a source of a digital asset definition and of an issuer of digital asset instances based on the digital asset definition. As one non-limiting example, an art museum might act as a legal issuer entity by creating a digital asset definition and issuing digital asset instances of a high-resolution copy of an item of artwork owned by the museum. In some examples, a digital asset definition (or "DAD") can include a legal definition of a digitized core asset. In some examples, a digital asset definition (DAD) serial number is a globally unique serial number of a digital asset definition (e.g., used in the digital asset definition file).

In some examples, a core asset represents a digitized asset without any embellishments. As one example, a core asset might include a high-resolution digital scan of a painting/canvas or a digital scan of paper asset. In some examples, a digital asset instance (or "DAI") is an instance of a core asset as defined by a corresponding digital asset definition. A digital asset instance contains an encrypted core asset and can be stored in an off-chain data repository (e.g., a wallet).

In some examples, a digital asset token (or "DAT") can include a token stored on a blockchain and that represents the ownership of one (1) digital asset instance. For example, for each digital asset instance, there is a corresponding digital asset token. In some examples, a digital asset instance (DAI) serial number is a globally unique serial number of an instance of a core asset. This can be different, for example, from the serial number of the definition of the asset (e.g., the digital asset definition (DAD) serial number). In some examples, an instance generation can refer to the generation (or "version") of a digital asset instance (DAI) with the same digital asset instance (DAI) serial number. In some examples, instance privacy indicates whether a core asset is encrypted for access by only an intended recipient/holder.

In some examples, a digital asset management provider is a service provider that manages the digital asset instances belonging to an owner. This entity may be the same as the legal issuer entity or a separate entity. In some examples, a digital asset instance (DAI) owner or holder is the entity that buys and holds an instance of an asset.

In some examples, the right of first purchase indicates whether the right of first purchase (or "RoFP") rule applies to a digital asset instance. This means, for example, that existing holders of other instances have the privilege to bid first on an instance that is up for sale. In some examples, a right of first purchase duration is a set time duration (after an intention to sell has be declared) within which existing holders must purchase an instance for sale.

In some examples, a primary blockchain is the main blockchain network where an instance of an asset is made available for purchase by buyers. In some examples, an instance encryption key (or "IEK") is the symmetric key used to encrypt an instance of an asset. In some examples, a key wrapping key (or "KWK") is the symmetric key that may be used to encrypt an instance encryption key. In some examples, a key identifier is a random string of a specific length that is associated with either an instance encryption key or key wrapping key.

In some examples, an asset access device (or "AAD") is any computing device with cryptographic capability to decipher an encrypted core asset and to protect the keys used to decipher the asset. In other examples, an asset access device is a digital asset instance wallet. In some examples, an asset insurance carrier is a legal entity that provides insurance to the issuer and the owner of a digital asset instance. The asset insurance carrier has read-access to parts of the trusted hardware used by the legal issuer entity and the current owner to protect a core asset.

1. Overview of Phases in the Creation of Digital Assets and Transactions

In some examples, there are several phases relating to the creation of a digital asset instance that conforms to a digital asset definition. FIG. 1 is a diagram illustrating an overview of interactions between some of the entities involved, e.g., in the creation of digital asset instances, digital asset tokens, and in the exchange of ownership of digital asset tokens representing digital asset instances.

Creation of a digital asset definition: In some examples, a legal issuer entity (or simply "issuer") (e.g., legal issuer entity 100 in FIG. 1) first defines the composition and substance of the asset that is to be digitized and made available via tokens on a blockchain (e.g., an asset trading platform (e.g., blockchain) 102 in FIG. 1). The asset definition file can be referred to as the digital asset definition (or "DAD") and represents the specification of the asset's digital instances.

Creation of instances of a digital asset according to a digital asset definition: In some examples, a legal issuer entity 100 uses computing device(s) 106 to generate one or more instances (e.g., N instances) of a digital asset according to the specifications stated in a corresponding digital asset definition file. These instances are referred to as digital asset instances (or "DAIs"). A digital asset instance is an off-chain data structure that carries the relevant core asset of interest to the buyer/owner. In some embodiments, these instances can be stored in a digital asset instance wallet 104A associated with the legal issuer entity 100.

Managing digital asset instances in asset access devices/wallets: After a legal issuer entity 100 creates digital asset instance(s) within its own trusted storage, a buyer (e.g., asset current holder/owner 114 in FIG. 1) can then acquire the rights to a digital asset instance (e.g., by purchasing the digital asset instance). When a buyer acquires the rights to a digital asset instance, in some examples, the legal issuer entity 100 transfers (or moves) the digital asset instance to an asset access device (e.g., a digital asset instance wallet 104B associated with an asset consumption device 116A) of the new owner. In some examples, the legal issuer entity 100 ensures that the asset access device of the new owner complies with the security requirements defined by the issuer (e.g., where the security requirements can include a specification of compatible trusted hardware) and can remotely manage devices holding digital asset instances.

Making a tokenized representation of the digital asset instance available on the blockchain: In order for the ownership of an off-chain digital asset instance to be tradeable between a seller (owner) and buyer, in some examples, a tokenized representation of a digital asset instance is created by the legal issuer entity 100 on a blockchain 102. This tokenized representation is referred to as digital asset token (or "DAT"). For a given valid digital asset instance (off-chain, e.g., in the off-chain real world 118), in some examples, there is exactly one valid digital asset token (on-chain, e.g., in the blockchain world 120) that corresponds to the digital asset instance. There is a consistent 1-to-1 correspondence between a digital asset instance and its digital asset token.

Publishing asset transfer smart contracts for digital asset tokens on the blockchain: In some examples, the legal issuer entity 100 also publishes (or otherwise makes available) the relevant smart contracts on the blockchain 102 to perform the ownership transfer from a seller (current owner) to a buyer on the blockchain 102. When a seller ("Alice") wishes to transfer ownership (e.g., by selling) of her digital asset instance (off-chain) to a buyer ("Bob") (e.g., one of potential buyers 110), in some examples, Alice invokes the smart contract that transfers the on-chain ownership of the corresponding digital asset token to Bob. Thus, the change in ownership of the digital asset token on the blockchain from Alice to Bob triggers the change of ownership of the digital asset instance off-chain from Alice to Bob. In some examples, current owners of digital asset instances can also advertise digital asset instances for sale on the blockchain 102 and buyers can scan the blockchain 102 to identify assets for sale.

Management of digital asset instances in asset access devices (e.g., digital asset instance wallets): In some examples, the legal issuer entity 100 (or an asset management service provider nominated by the legal issuer entity) performs ongoing remote management of the asset access devices (e.g., digital asset instance wallets), namely, the trusted hardware carrying the digital asset instance which it has issued in the past. This is to ensure that a trusted asset access device is in a safe state and that the digital asset instance (i.e., the encrypted core asset) in the wallet is secure before, during, and after consumption by the current owner.

In some examples, a legal issuer entity 100 (or an asset management provider chosen by the legal issuer entity) performs ongoing synchronization between (i) the state of the ownership of an asset as expressed by a corresponding digital asset token on the blockchain 102 with (ii) the protection and movement of the core asset (outside the blockchain) from the current owner's trusted hardware to the new owner's trusted hardware (e.g., from an asset consumption device 116A to an asset consumption device 116B).

In some examples, a legal issuer entity 100 (or the asset management provider) or the current owner of a digital asset instance can nominate an asset insurance carrier 112 to provide underlying asset insurance to the owner and the issuer. In some examples, the insurance carrier 112 uses computing device(s) 108 to obtain remote visibility into the status of the asset access devices (e.g., digital asset instance wallets) at the issuer and at the owner (e.g., of the legal issuer entity 100 and asset current holder/owner 114). This state visibility can include knowledge of the type of trusted hardware used for the digital asset instance wallets (e.g., digital asset instance wallets 104A, 104B, 104C, etc.), the type of cryptographic keys protecting the core asset, copies of the public key, evidence of movements (change of ownership) of the digital asset instances, and so on.

2. Creating Digital Asset Definitions

In some examples, an initial phase in the process is for the owner of an asset to engage with a legal issuer entity 100 (or "issuer") with the goal of requesting the legal issuer entity to create a definition of the digital version of the asset. In some examples, an owner of an asset can engage with a legal issuer entity in any of a variety of ways including, for example, accessing a web-based portal provided by the legal issuer entity (e.g., via which an owner of an asset can upload or otherwise provide a copy of a digital asset instance), by providing a copy of a digital asset on a physical storage medium, etc. The resulting data structure is referred to as a digital asset definition (or "DAD"). The digital asset definition can be stored as a file or other data structure, where the data contained in the file can be stored in a structured, semi-structured, or other data format (e.g., as a JSON- or XML-formatted data). In some examples, this task is witnessed by another entity as a means to ensure the real-world core asset (e.g., an item of artwork) exists.

FIG. 2 is a diagram illustrating an example digital asset definition (or "DAD") corresponding to a core asset 200 and associated technical information 202 according to some embodiments. In some examples, a digital asset definition file 204 contains some or all the following items:

Digital asset definition serial number: In some examples, a digital asset definition file 204 is assigned a globally unique serial number 206 (e.g., a UUID).

Digital asset definition issuer legal name and business registration number: In some examples, the digital asset definition includes the legal issuer entity's legal name and/or the business registration number 208 (e.g., incorporation number, legal entity identifier, etc.).

Digital asset definition issuer's public key: In some examples, the digital asset definition includes the legal issuer entity's public key 210.

Digital asset definition issuer's certificate serial number: In some examples, the digital asset definition includes the legal issuer entity's serial number of the issuer's X.509 certificate 212.

Description of the asset: In some examples, the digital asset definition includes a uniquely identifying text description of the asset 214 (e.g., physical goods), possibly with a digital photograph of the asset.

Hash of core asset: In some examples, the digital asset definition includes a cryptographic hash of the core asset 216 in its purest form without any embellishments.

Degree of fungibility: In some examples, the digital asset definition includes a value indicating the number of the instances of the asset (or tokens) permitted (e.g., a degree of fungibility 218). For example, this typically is expressed using an integer number.

Digital asset instance privacy: In some examples, the digital asset definition includes a binary flag 220 (e.g., a value indicating "yes" or "no") to indicate whether the digital asset instance will be encrypted (e.g., using the encryption key of its owner).

Right of first purchase: In some examples, the digital asset definition includes a binary flag 222 (e.g., a value indicating "yes" or "no") indicating whether existing holders of a digital asset instance have the privilege to be the first to purchase or to bid for another soon to be for sale.

Blockchain identifier: In some examples, the digital asset definition includes an identifier of a blockchain on which digital tokens are located corresponding to digital asset instances created based on the digital asset definition.

Witnessing party: In some examples, the digital asset definition includes the legal and business name of the witness 228.

Witness public key: In some examples, the digital asset definition includes the public key 230 of the witness.

Witness certificate serial number: In some examples, the digital asset definition includes the serial number of the X.509 certificate of the witness 232.

Date of issuance of the digital asset definition: In some examples, the digital asset definition includes a date/timestamp 224 indicating when this digital asset definition file was created and signed.

Issuer digital signature: In some examples, the digital asset definition includes the digital signature of the issuer 226 (using the private key matching the above public key).

Witness digital signature: In some examples, the digital asset definition includes a counter signature of the witness 234 on the digital asset definition file.

3. Creating Digital Asset Instances, Encryption, and Tokens

In some examples, in this phase, the legal issuer entity uses a computing device to create N number of digital asset instances according to the previously published digital asset definition file. A digital asset instance carries an encrypted core asset and therefore can be large in file size in some cases. Thus, in some examples, the digital asset instance is stored off-chain in a protected storage (e.g., local data storage managed by the issuer, e.g., in an on-premises environment, with security of the data store provided by the issuer). The entity that creates the N distinct instances can be referred to as the "digital asset instance issuer," which may or may not be the same legal entity that created the digital asset definition file (or "digital asset definition issuer").

For a given digital asset instance, in some examples, only one (1) copy of that digital asset instance (i.e., the digital asset instance file) can be valid at any given moment. In some examples, a given digital asset instance undergoes a "regeneration" process when it changes ownership (e.g., when the asset is sold to a new buyer). In this case, the asset core is encrypted using a new key that is made available only to the new owner. In some examples, the serial number of the digital asset instance remains unchanged because in essence it is the same non-fungible instance (i.e., the digital asset instance has not been split but rather only re-generated). However, each time a digital asset instance is re-generated, in some examples, the generation number field is incremented.

Figure 3:
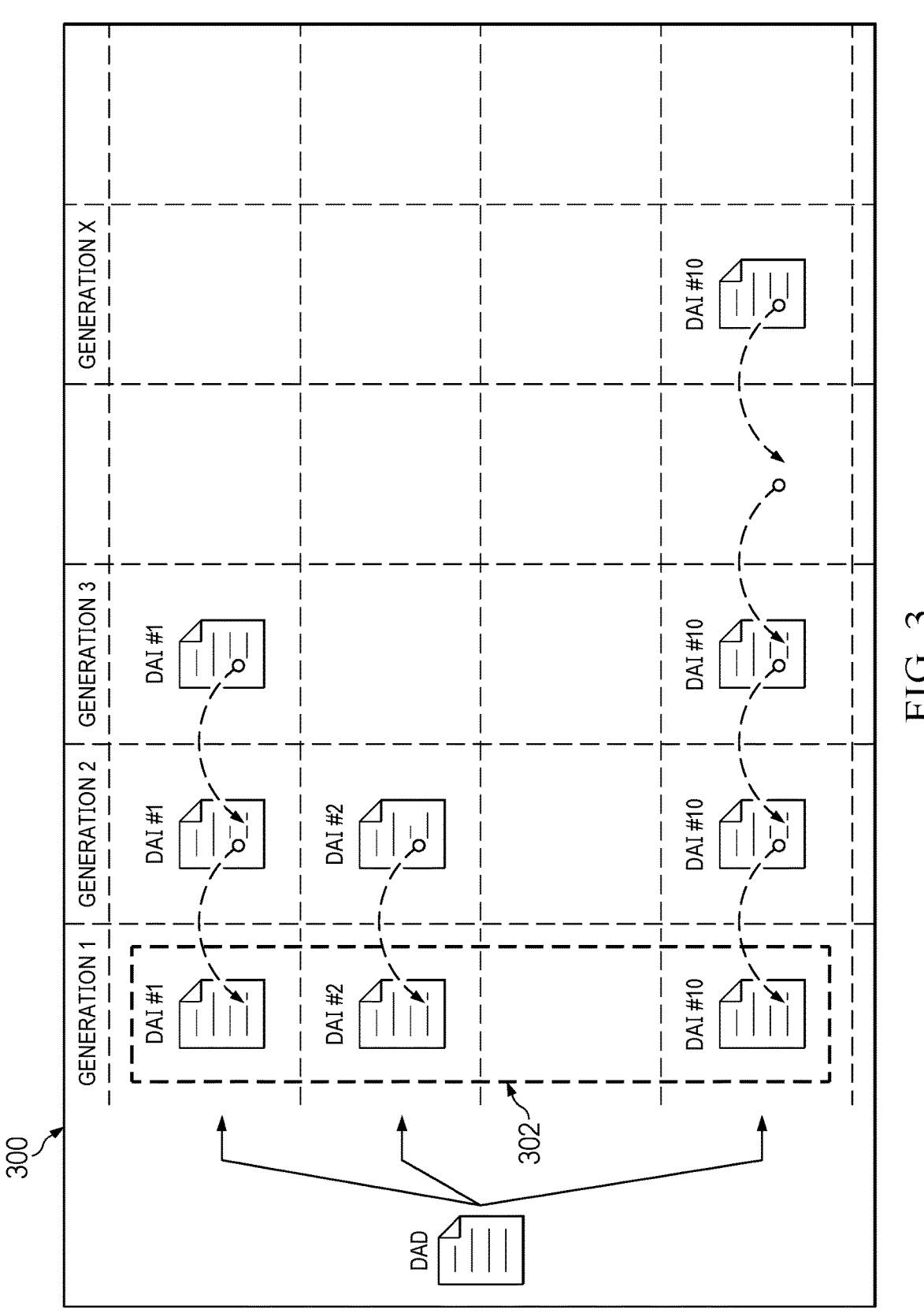
FIG. 3 is a diagram illustrating different generations of digital asset instances originating from an example digital asset definition permitting ten (10) instances of the asset to be instantiated according to some examples.

FIG. 3 is a diagram illustrating different generations of digital asset instances originating from an example digital asset definition permitting ten (10) instances of the asset to be instantiated according to some embodiments. As shown, ten instances of a digital asset (e.g., represented by the separate digital asset instances 302 labeled DAI #1, DAI #2, . . . , DAI #10) are issued based on a digital asset definition 300. As indicated, as the respective digital asset instances change ownership, new "generations" of the respective digital asset instances are generated.

3.1. Digital Asset Instances

In some examples, a digital asset instance (or "DAI") is a signed data structure that represents a legally valid instance of an asset that implements a given digital asset definition (DAD). The number of permitted instances of an asset is specified in the corresponding DAD file. For N digital asset instances (of a core asset) created by the digital asset instance issuer (e.g., a legal issuer entity), each of the digital asset instances is assigned a different serial number. Furthermore, in some examples, the core asset in each instance is encrypted (by the digital asset instance issuer) using a different cryptographic key that is labeled (or identified) using a different KeyID value in the digital asset instance file. For example, if a digital asset instance issuer created ten (10) instances of a core asset (e.g., an item of artwork), then in each of the resulting ten digital asset instance files, the digitized core asset (e.g., a bitmap of the item of artwork) is encrypted using a distinct key.

In some examples, the digital asset instance file(s) initially created by the digital asset instance issuer are referred to as "Generation-1" asset instances. The digital asset definition specification defines the maximum number of digital asset instances that are permitted to exist (e.g., a digital asset definition file might specify that only ten (10) copies of a digital Mona Lisa artwork can exist and thus a maximum of ten (10) digital asset instances corresponding to the digital Mona Lisa artwork can be created).

Thus, when the ownership of a digital asset instance is sold from a current owner ("Alice") to a new buyer ("Bob"), in some examples, then the digital asset instance is re-generated (by the digital asset instance issuer) for Bob. The result of the first regeneration process may be referred to, for example, as "Generation-2". In some examples, each time a digital asset instance file is sold or the ownership is otherwise transferred, the "Generation" count is incremented (as illustrate, e.g., in FIG. 3). Furthermore, each time a digital asset instance is sold to a new owner, in some examples, the digital asset instance is re-issued (with the "Generation" count incremented) with the core asset encrypted using a new encryption key. The serial number of the digital asset instance remains unchanged across regenerations. Additionally, in some examples, access to the existing digital asset instance by the previous owner(s) is disabled.

Figure 4:
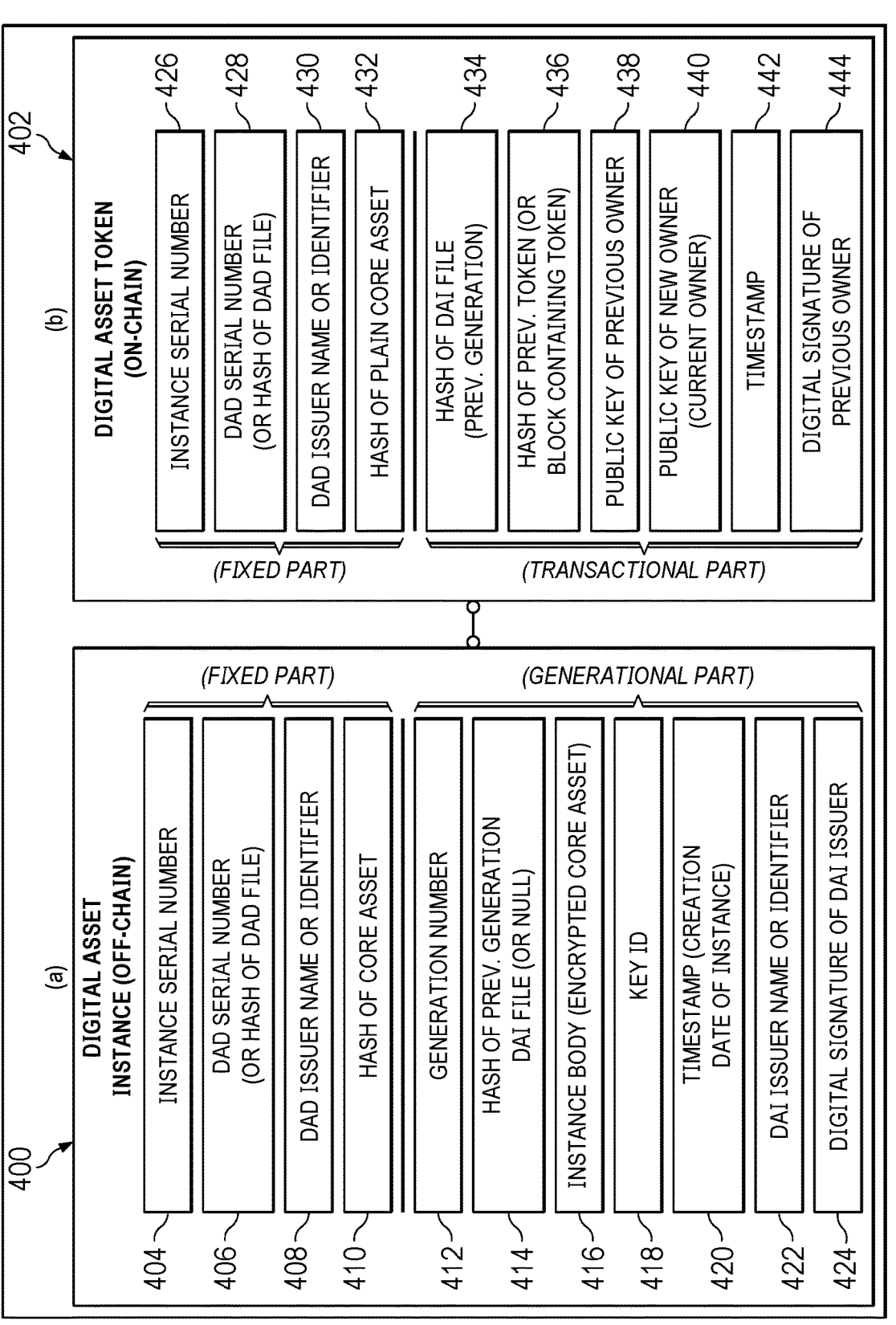
FIG. 4 is a diagram illustrating a digital asset instance (e.g., off-chain) and a corresponding digital asset token (e.g., on-chain) according to some examples.

In some examples, the fields of a digital asset instance (DAI) include several data fields illustrated by the digital asset instance 400 in FIG. 4.

Instance serial number: In some examples, a digital asset instance 400 includes a globally unique number 404 (e.g., UUID) associated with this digital asset instance. If there are N instances of an asset, then each is associated with a unique instance serial number 404. In some examples, the serial number 404 assigned to a digital asset instance is unchanged across different generations of the digital asset instance.

Digital asset definition serial number: In some examples, a digital asset instance includes the serial number 406 of the corresponding digital asset definition (DAD) file. In some examples, a hash of the DAD file is used or also included. In some examples, the digital asset definition serial number remains unchanged across different generations of a digital asset instance.

Digital asset instance issuer legal name and business registration number: In some examples, a digital asset instance 400 includes the issuer's legal name and the business registration number 408 (e.g., the issuer's incorporation number, legal entity identifier number, etc.). In some examples, this value is unchanged across different generations of a digital asset instance.

Hash of core asset: In some examples, a digital asset instance 400 includes a hash of the core asset 410. In some examples, this value is unchanged across different generations of a digital asset instance.

Generation number: In some examples, a digital asset instance 400 includes a "generation number" 412 reflecting a current generation (or "version") of the same digital asset instance. In some examples, a generation number 412 is incremented each time the corresponding digital asset instance file is replaced (i.e., re-generated) with a new one.

Hash of previous digital asset instance file: In some examples, a digital asset instance 400 includes a hash 414 of the previous generation of the same digital asset instance file. For the first generation of an instance created directly by the issuer, in some examples, this value is nil.

Instance body: In some examples, a digital asset instance 400 includes an instance body 416 comprising a set of bytes of the digital representation of the encrypted core asset. In some examples, the core asset is encrypted using a key that is identified (or tagged) by the value in a KeyID field 418.

Key identifier: In some examples, a digital asset instance 400 includes a KeyID 418 string that identifies the instance encryption key (or "IEK") used to encrypt the instance body.

Date of instance creation: In some examples, a digital asset instance 400 includes a date or timestamp 420 indicating when the digital asset instance was generated.

Signature of digital asset instance issuer: In some examples, a digital asset instance 400 includes an identifier of the issuer 422 and a digital signature of the creator of this digital asset instance file 424.

3.2. Summary of the Digital Asset Token (DAT)

In some examples, the function of a digital asset token (or "DAT") data structure is to denote the ownership via the blockchain of a digital asset instance (or "DAI"). The digital asset token is therefore recorded on the ledger of the blockchain. In some examples, each time a digital asset instance changes ownership (e.g., is sold to a new buyer), the transaction occurs on the blockchain using the digital asset token structure. Correspondingly, in some examples, a new generation of the digital asset instance is created and the new encryption key delivered to the buyer (i.e., to their trusted device) through a secure channel (i.e., off-chain).

As indicated, FIG. 4 illustrates an example relationship between a digital asset instance and a digital asset token according to some embodiments. An example digital asset token 402 is shown, which reflects the current state of a digital asset token as confirmed on the blocks of data on the ledger of the blockchain. For example, when a first person ("Alice") sells her digital asset instance to a second person ("Bob"), then Alice is denoted in the token as the previous owner, while Bob is the new owner (i.e., current/latest owner).

In some examples, the fields of a digital asset token (or "DAT") include some or all the following (see FIG. 4):

Digital asset instance serial number: In some examples, a digital asset token 402 includes a globally unique number 426 (e.g., a UUID) associated with the corresponding digital asset instance. For example, this value is the same as found in the corresponding digital asset instance file.

Digital asset definition serial number: In some examples, a digital asset token 402 includes the serial number 428 of the corresponding digital asset definition (DAD) file.

Digital asset definition issuer legal name and business registration number: In some examples, a digital asset token includes the issuer's legal name and the business registration number 430 as found in the corresponding DAD file.

Hash of digital asset instance file: In some examples, a digital asset token 402 includes a hash of the digital asset instance file 434 to which the digital asset token pertains.

Issue date: In some examples, a digital asset token 402 includes the date of creation of the digital asset instance file represented by this digital asset token.

Hash of previous digital asset token: In some examples, a digital asset token 402 includes the hash of the latest digital asset token 436 found on the blockchain (representing the current owner/holder) of the digital asset instance.

Block information: In some examples, a digital asset token 402 includes the hash of the block (or block number) on the blockchain (block of confirmed/settled transaction) where the latest (previous) digital asset token can be found.

Public key of the previous digital asset instance owner: In some examples, a digital asset token 402 includes the public key 438 of the previous owner of the digital asset instance (e.g., the person or entity who previously sold the digital asset instance to a current owner) via the blockchain.

Public key of the current digital asset instance owner: In some examples, a digital asset token 402 includes the public key 440 of the current owner of the digital asset instance, namely, the most recent owner as recorded by the latest confirmed blocks on the ledger of the blockchain.

In some examples, a digital asset token 402 includes a timestamp 442 and digital signature 444.

In some examples, for a given digital asset instance (DAI) and its matching on-chain digital asset token (DAT), the first owner of these is defined to be the legal issuer entity. For the first digital asset token on the blockchain for the digital asset instance, the seller and buyer are represented by the same public key (namely, the public key of the legal issuer entity), signifying that initially (at time "zero") it is the legal issuer entity who owns the digital asset instance.

3.3. Encryption of the Core Asset Inside a Digital Asset Instance

In some examples, a purpose of encrypting the core asset within a digital asset instance (DAI) is to limit access only to the owner of that digital asset instance. In some examples, the ownership is proven by the corresponding digital asset token on the blockchain that is owned by a user (i.e., bound to the public key of the user on a confirmed transaction on the blockchain).

In some examples, given N distinct digital asset instances (DAIs), the creator of the digital asset instance (e.g., the legal issuer entity) generates a unique symmetric key for each one of the digital asset instances. These types of keys are referred to as instance encryption keys (or "IEKs").

Thus, if the digital asset definition (DAD) specifies that ten (10) instances are created (e.g., N=10), then the issuer generates ten (10) unique instance encryption keys. In some examples, an instance encryption key associated with a given digital asset instance owned by a user (e.g., a digital asset instance owner) is delivered to the user (i.e., to the user's trusted device) via a secure means. For example, a user may obtain a trusted hardware device (e.g., as specified by the legal entity issuer of the digital asset) or, in some examples, a trusted hardware device may be provided to the owner by the issuer. In some examples, the trusted hardware can be incorporated into a physical object (e.g., a painting, a clothing item, other consumer product, etc.). In some examples, such trusted hardware devices can be registered with the legal issuer entity to enable the establishment of secure connections can be used to exchange encrypted assets, associated keys, etc., as described below.

Depending on the type of core asset as defined by the digital asset definition file, the core asset may be restricted to be accessible only using a specific device employing a specific type of trusted hardware. In this case, in some examples, the trusted device (i) generates internally a public/private key pair specifically and uniquely for the digital asset instance and (ii) exports out the public key of the public/private key pair to the software in the trusted device that is communicating with the issuer (or creator) system that is instantiating the digital asset instance file.

3.4. Asset Management Services (Off-Chain)

Figure 5:
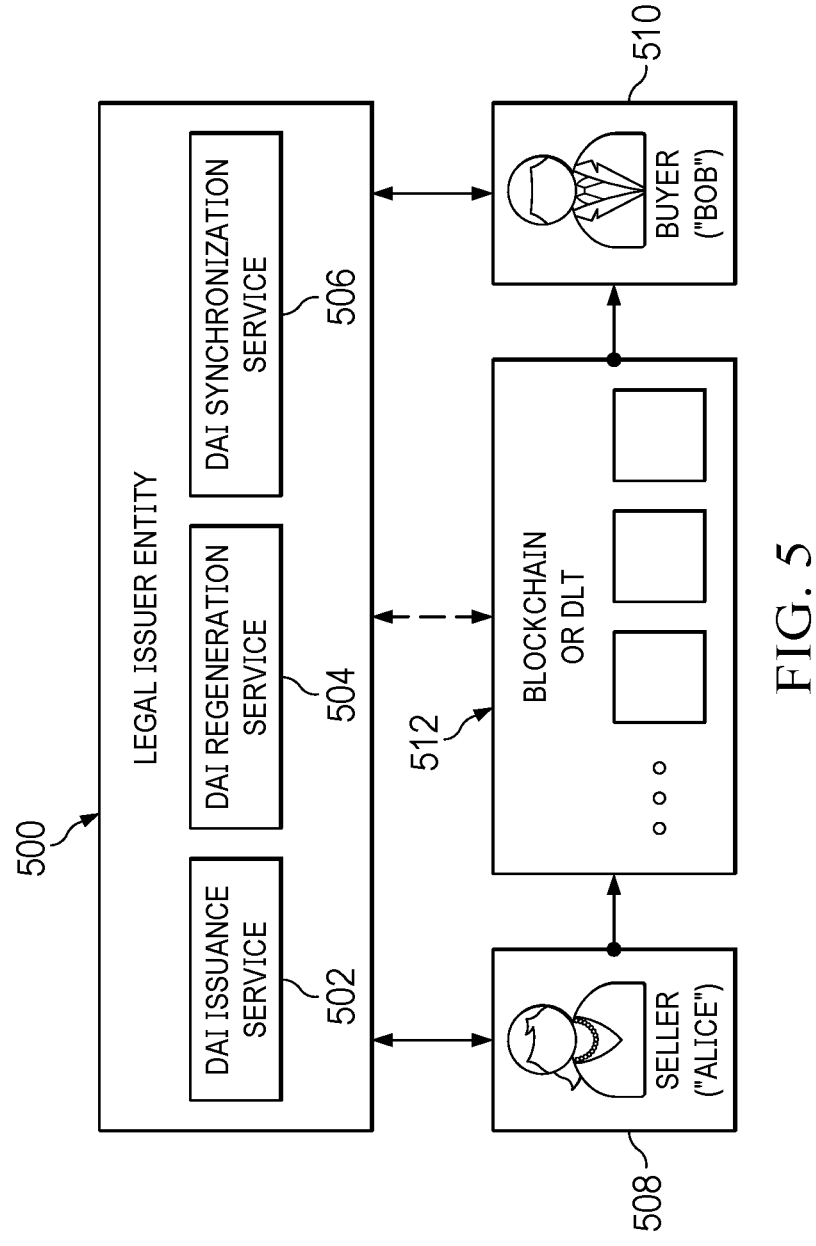
FIG. 5 is a diagram illustrating example services provided by a legal issuer entity (or asset management service provider) according to some examples.

In some examples, a legal issuer entity (or an asset management service provider nominated by the issuer) operates several services related to the issuance, trading, and maintenance of the digital asset instances (e.g., as illustrated in FIG. 5). In some embodiments, these services can be implemented as software-based services running on cloud-based resources, on-premises computing resources, etc.

Digital asset instance issuance service 502: In some examples, a digital asset instance issuance service 502 is used to initially issue the digital asset instances in accordance to the prescription within a digital asset definition (DAD). Thus, for example, if a digital asset definition file specifies that N (e.g., N=10) instances of the asset are permitted to be created, then the asset issuance service generates these instances, each with their unique cryptographic keys used to protect the core asset.

Digital asset instance regeneration service 504: In some examples, a digital asset instance regeneration service 504 assists in the trading of a digital asset instance on the blockchain. Thus, once a current owner ("Alice") of a digital asset instance file transfers ownership of a matching digital asset token (e.g., see FIG. 4) to a new owner ("Bob") on the blockchain, in some examples, the regeneration service creates (off-chain) a new generation of that digital asset instance, where the core asset is encrypted to the keys held by Bob. The regeneration service also disables access by the previous owner (e.g., Alice) using the synchronization service (e.g., using the synchronization services provided by the trusted hardware device).

Digital asset instance synchronization service 506: In some examples, a digital asset instance synchronization service is a live, 24×7 service that permits a trusted device holding the key for decrypting the core asset in a digital asset instance to continuously indicate liveliness to the service and to perform fast key rotations to ensure the security of the core asset within the specific digital asset instance. For example, the trusted hardware used by an owner of the asset can be configured such that if liveliness is not detected then the memory storing the digital asset instance can be erased.

FIG. 5, for example, is a diagram illustrating example services provided by a legal issuer entity (or asset management service provider) according to some embodiments. As shown, the legal issuer entity 500 provides a digital asset issuance service 502, a digital asset instance regeneration service 504, and a digital asset instance synchronization service 506. The example shown in FIG. 5 also illustrates an example of a transaction between a seller 508 and a buyer 510 exchanging a digital asset instance via digital asset tokens stored on a blockchain or other digital ledger technology (DLT) 512.

3.5. Synchronization of Digital Asset Instance Access Control

Since a digital asset instance (off-chain) carries an instance of the core asset (encrypted to the trusted device of the current owner), in some examples, an ongoing asset access control synchronization protocol is employed to ensure that (a) the trusted device remains in the same trustworthy state as the when the digital asset instance was provided to device, and (b) that the device is online and live (e.g., freshness in synchronization protocol).

Depending on the type of trusted device employed by the digital asset instance owner to access a digital asset instance (e.g., to display the associated core asset), an additional synchronization counter (e.g., which is included in the trusted hardware device) may be added and displayed when the core asset is being used (e.g., displayed). This synchronization counter represents an authoritative mark that the instance of the core asset is genuine (i.e., not counterfeit). In some examples, previous owners of a digital asset instance will not have access to the synchronization service that performs the live sync of the counter and thus cannot claim as being a legitimate owner of the instance (despite possibly having made a copy of the core asset locally).

4. Asset Transfer Smart Contract

When the current owner of a digital asset instance (DAI) seeks to sell the digital asset instance to a buyer, in some examples, the business transaction is conducted on the blockchain using the digital asset token (DAT) as a means to legally record the transfer of ownership. In some examples, an asset transfer smart contract (or "ATC") on the blockchain is used to record this ownership change. The blockchains and smart contract can be used, for example, (i) to retain publicly readable evidence regarding the current ownership of a non-fungible asset and (ii) to facilitate the reading or exchange of the asset.

4.1. Tasks

In some examples, there are several tasks involved in establishing a successful transfer of ownership using an asset transfer smart contract between a seller ("Alice") and a buyer ("Bob"). Some of these tasks may be performed on-chain, while others are performed off-chain by the digital asset instance issuer's services:

New digital asset token (DAT) recorded on the blockchain: In some examples, an asset transfer smart contract creates a new digital asset token on the ledger of the blockchain, where the digital asset token shows the public key of the previous owner (e.g., "Alice") and the public key of the new owner (e.g., "Bob") (e.g., see FIG. 4).

Regeneration of digital asset instance (DAI) off-chain: The digital asset instance regeneration service 504 (e.g., see FIG. 5) employs a daemon process that monitors any new asset exchanges and triggers the regeneration of the digital asset instance with the core asset encrypted to the new owner (e.g., "Bob").

Disablement of access to core asset at previous owner: The digital asset instance regeneration service also informs the synchronization service to remotely disable access to the core asset by the trusted device in possession of the previous owner (e.g., "Alice").

4.2. Inputs to an Asset Transfer Smart Contract

In some examples, there are several input parameters that the seller ("Alice") provides as input (e.g., using a computing device) into the on-chain smart contract in order to establish the legal sale of a digital asset instance to a buyer ("Bob"). Alice is assumed to be employing a client system (e.g., a wallet) that helps her in creating transaction inputs when the client invokes the smart contract.

In some examples, the inputs to an on-chain smart contract include some or all the following:

Transaction number on blockchain of last digital asset token ownership change: As the current owner, in some examples, Alice provides as input the transaction number (on the confirmed block) that shows the latest owner of the digital asset token corresponding to the digital asset instance. Alternatively, in some examples, the digital asset instance serial number can also be used, whereby the smart contract first searches through the confirmed blocks to find the last digital asset token transaction bearing the provided digital asset instance serial number. In either case, the smart contract validates that Alice (i.e., based on her public key) is the last owner of the digital asset token on-chain.

Public key of the buyer: In some examples, the owner (e.g., Alice) provides as input the buyer's (e.g., Bob's) public key as the recipient of the ownership transfer of the digital asset token performed by the smart contract.

Signature of the seller: In some examples, the owner (e.g., Alice) signs the transaction that invokes the smart contract, signifying that Alice is the seller.

4.3. Summary of Asset Transfer Smart Contracts Processes

Figure 6:
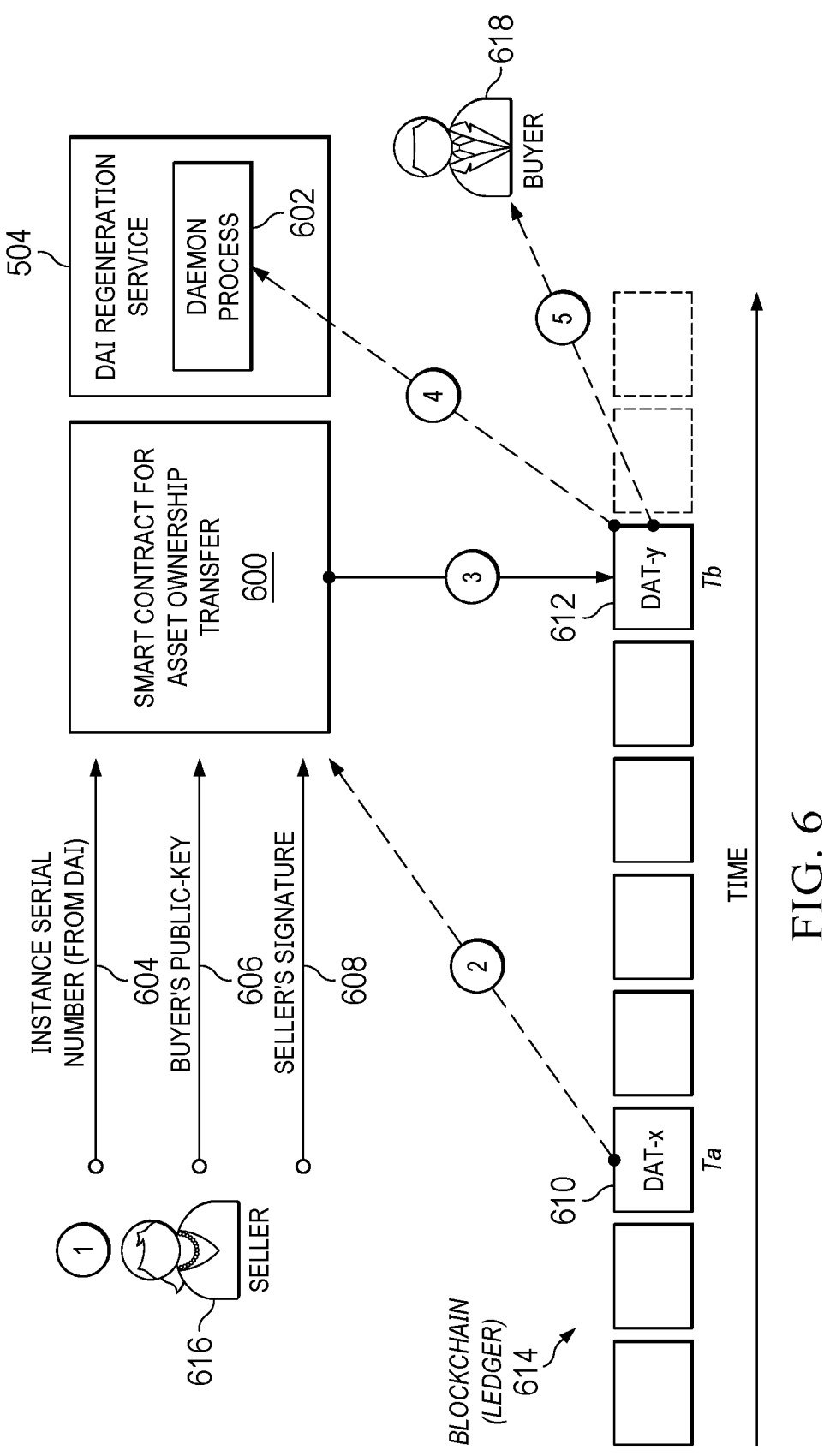
FIG. 6 is a diagram illustrating an overview of an asset transfer smart contract according to some examples.

An overview of the steps for a seller ("Alice") to sell her digital asset instance to a buyer ("Bob") is illustrated in FIG. 6. In some examples, the steps include, at circle "1," the seller 616 using her computer system (e.g., a computer system executing wallet software) to invoke/call the asset transfer smart contract 600, providing as input at least some or all the following: (i) the instance serial number of her digital asset instance 604, (ii) the public key of the buyer 606 (e.g., Bob), and (iii) evidence of her digital signature 608 upon the request. Optionally, in some examples, if multi-signatures are enabled, then the seller also provides as input the public key of the issuer of the digital asset instance (multi-signatures are described in more detail elsewhere herein).

In some examples, at circle "2," the asset transfer smart contract searches through the confirmed blocks of the ledger 614 for a digital asset token carrying the instance serial number that was provided as input by the seller at circle "1". This search is performed backwards in time from the most recent block to the older (genesis) block. If no blocks are found, in some examples, the smart contract rejects the seller's invocation and returns an error message. Optionally, the smart contract 600 may log this attempt by the seller on the ledger 614 for historical purposes. If the smart contract finds the most recent digital asset token (referred to as "DAT-x 610" in FIG. 6) on the ledger with a matching instance serial number, the smart contract 600 validates that the recipient is Alice (the current seller). That is, in some examples, the smart contract 600 validates that Alice is the most recent owner of the digital asset instance by virtue of the DAT-x 610 entry in the ledger created at time Ta.

In some examples, at circle "3," the smart contract 600 then creates a new digital asset token (referred to as "DAT-y 612" in FIG. 6) with a timestamp at time Tb. This digital asset token 612 records the new owner of the digital asset instance using Bob's public key, thereby signifying that Bob is the new owner of the corresponding digital asset instance.

Meanwhile, in some examples, at circle "4," the transaction scanning daemon process 602 of the digital asset instance regeneration service 504 (operated by the issuer) detects that a new "DAT-y 612" has been created on the ledger and that the new digital asset token carries an existing instance serial number (of a digital asset instance that was established sometime in the past, thereby indicating to the daemon process 602 that there is a new owner of the corresponding digital asset instance (e.g., Bob)). In some examples, the daemon process 602 then triggers the digital asset instance regeneration service 504 to prepare a new digital asset instance off-chain containing the core asset encrypted for Bob. The daemon also triggers the synchronization service 506 to disable the digital asset instance in the trusted device of the previous owner (e.g., Alice) to prevent Alice from accessing the digital asset instance.

In some examples, at circle "5," when the smart contract transaction has been confirmed on the ledger and a new DAT-y is created on the ledger, the new owner of the digital asset instance (e.g., Bob) is able to see in DAT-y (with timestamp Tb) that he is the new legal owner of the digital asset instance. The buyer 618 can then prepare to receive the digital asset instance from the regeneration service 504 (e.g., off-chain).

5. Multi-Signatures for Asset Transfers

In some examples, an option within the setup of the legal issuer entity is whether asset sales (i.e., transfers of digital asset instance ownership) on the blockchain are required to include the digital signature of the legal issuer entity. If this option is configured, in some examples, a separate smart contract is utilized to implement a multi-signature function.

Figure 7:
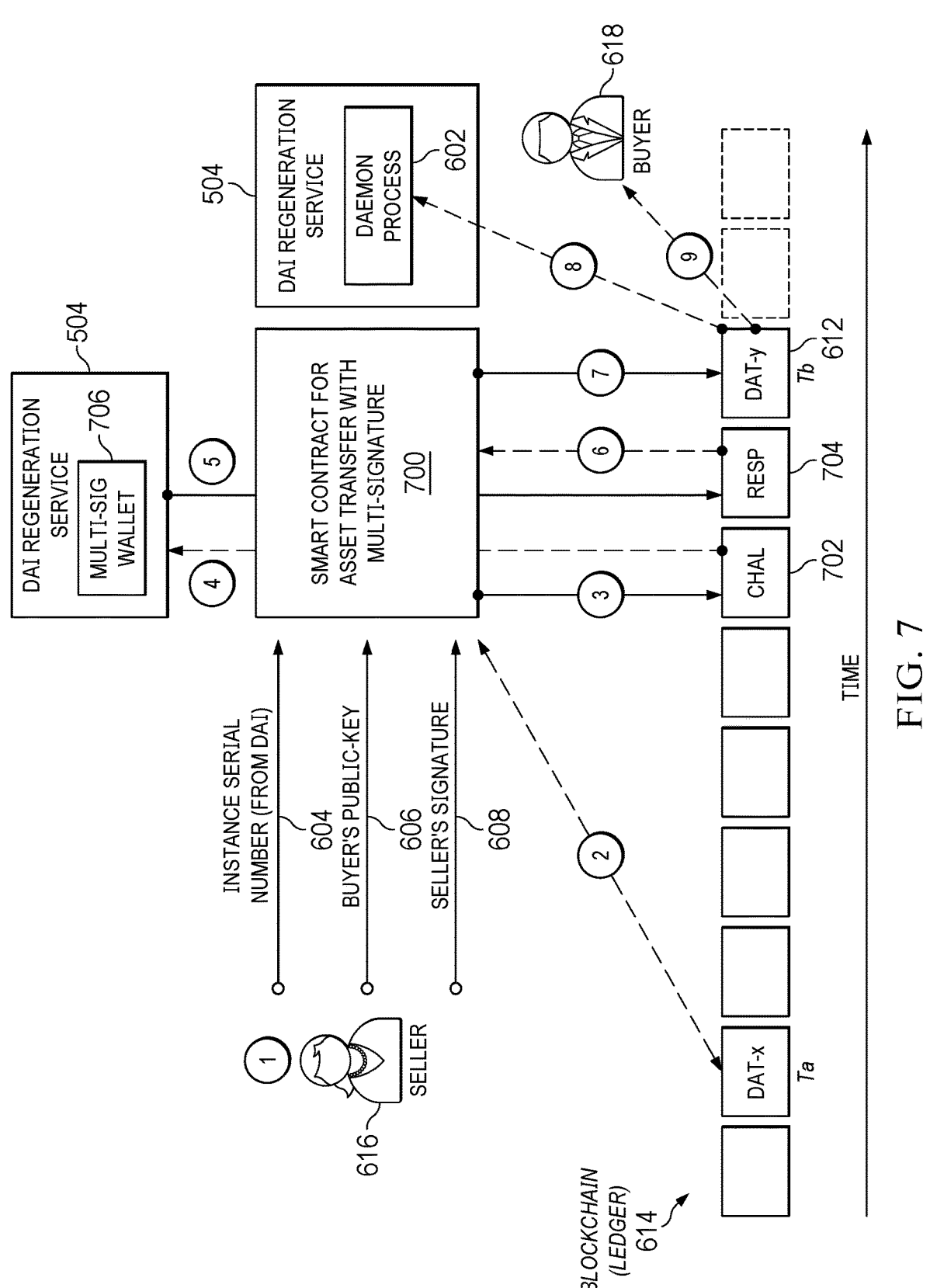
FIG. 7 is a diagram illustrating an overview of an asset transfer smart contract with multi-signatures according to some examples.

The overview of examples steps for a seller ("Alice") to sell her digital asset instance to a buyer ("Bob") is summarized in FIG. 7. In some examples, these steps include at circle "1," a similar process as illustrated in circle "1" in FIG. 6. For example, the seller 616 uses her computer system (e.g., a computer system executing wallet software) to invoke/call the asset transfer smart contract 600, providing as input at least some or all the following: (i) the instance serial number of her digital asset instance 604, (ii) the public key of the buyer 606 (e.g., Bob), and (iii) evidence of her digital signature 608 upon the request. Optionally, in some examples, if multi-signatures are enabled, then the seller also provides as input the public key of the issuer of the digital asset instance (multi-signatures are described in more detail elsewhere herein).

In some examples, circle "2" in FIG. 7 is also similar to circle "2" in FIG. 6. For example, the asset transfer smart contract 700 searches through the confirmed blocks of the ledger 614 for a digital asset token carrying the instance serial number that was provided as input by the seller at circle "1". This search is performed backwards in time from the most recent block to the older (genesis) block. If no blocks are found, in some examples, the smart contract rejects the seller's invocation and returns an error message. Optionally, the smart contract 700 may log this attempt by the seller on the ledger 614 for historical purposes. If the smart contract finds the most recent digital asset token (referred to as "DAT-x 610" in FIG. 6) on the ledger with a matching instance serial number, the smart contract 700 validates that the recipient is Alice (the current seller). That is, in some examples, the smart contract 700 validates that Alice is the most recent owner of the digital asset instance by virtue of the DAT-x entry in the ledger created at time Ta.

In some examples, at circle "3," the smart contract 700 creates a hash of the inputs provided by Alice at circle "1" and records the resulting digest value (timestamped) on the ledger as a challenge value 702 (labeled "chal" in FIG. 7).

In some examples, at circle "4," a multi-signature wallet system 706 at the issuer (digital asset instance regeneration service 504) reads this challenge value from the ledger 614 and digitally signs the challenge value.

In some examples, at circle "5," the multi-signature wallet system 706 records the signed challenge value onto the ledger of the blockchain 614. This is referred to as the response value 704 (labeled "resp" in FIG. 7).

In some examples, at circle "6," the smart contract 700 reads the response value 704 (resp) on the ledger 614 and proceeds to digitally sign it.

In some examples, at circle "7," the smart contract 700 then records the resulting signed response value onto the ledger 614 of the blockchain. In some examples, circle "8" is then similar to circle "4" in FIG. 6, and circle "9" is similar to circle "5" in FIG. 6.

6. Controlling Access to an Asset

Figure 8:
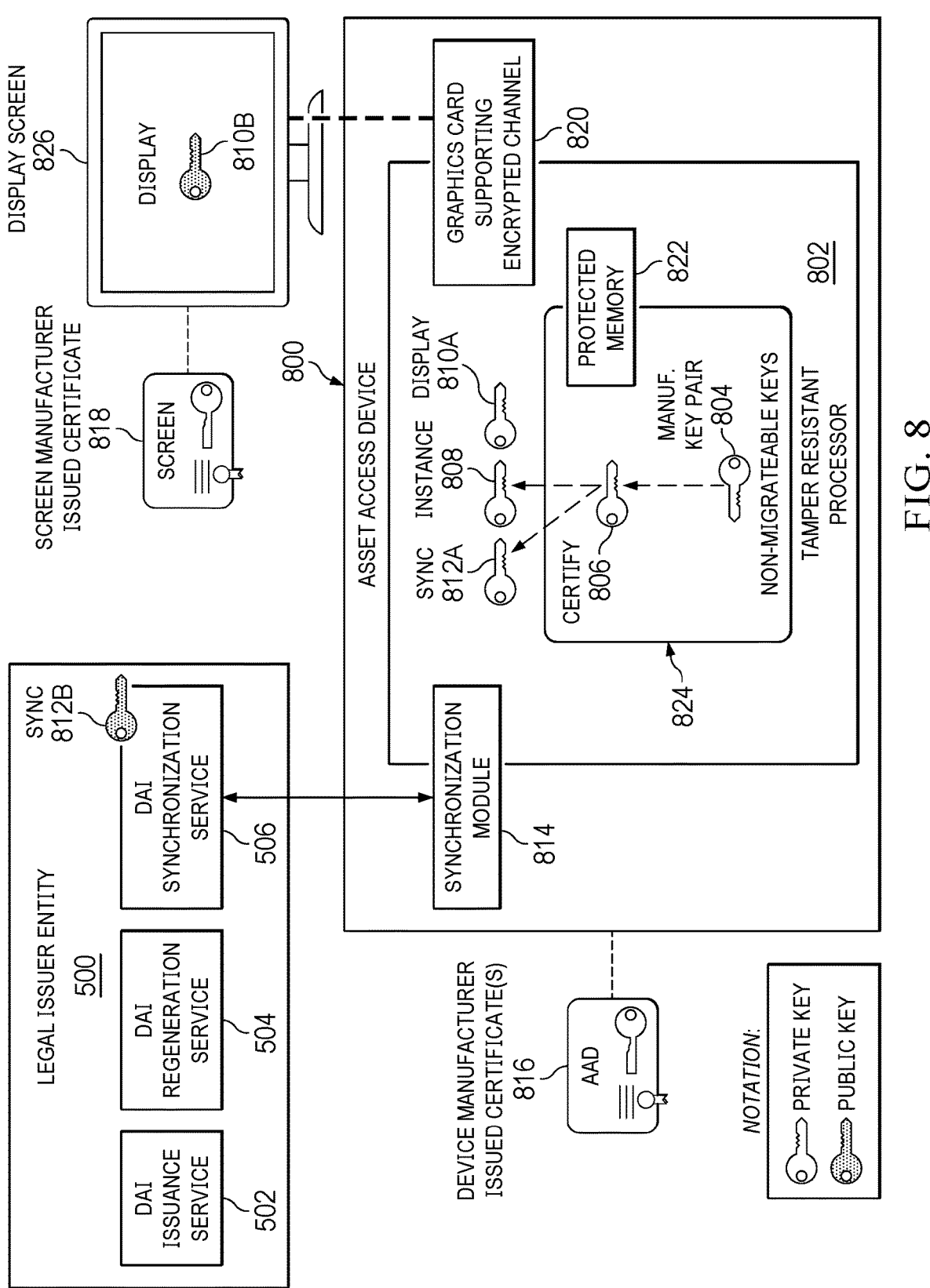
FIG. 8 is a diagram illustrating an example asset access device (or digital asset instance wallet) and its relationship to the secure consumption device (e.g., a secure display screen) according to some examples.

For certain types of assets (e.g., high value assets), the core asset itself is presented to a user using a display mechanism (e.g., a high-definition display screen) when it is to be "consumed" by the owner. In these cases and others, in some examples, a cryptographic binding is established between (i) the digital asset instance (DAI) that carries the encrypted core asset, (ii) the proof of ownership of the asset (as represented by the digital asset token (DAT) on-chain, (iii) the asset access device (e.g., digital asset instance wallet) containing the core asset of the digital asset instance, and (iv) the asset consumption device (e.g., a secure LCD screen) that will present the asset (e.g. artwork) to the owner. FIG. 8 illustrates a trusted device as the asset access device 800 (or "AAD") and its features according to some examples. In some examples, the asset access device 800 is physically bound to the display unit (referred to as the display screen 812) with a secure physical path on the electronics layers (e.g., implemented in part by a graphics card 820 that supports an encrypted channel) that permits a deciphered core asset to be shown on the screen without being intercepted physically. In some examples, additional means are used to ensure freshness or liveliness of the secure connection between the asset access device 800 and the screen 812.

6.1. Summary of Features and Keys in an Asset Access Device

In some examples, the features of an asset access device 800 can include groupings of encryption keys associated the hardware, a graphics card 820 supporting an encrypted channel—the trusted hardware used to decrypt the artwork and send it to the display screen 812, among other features. In some examples, a tamper resistant processor 802 and a board to which the processor is coupled could come from different manufacturers and can be associated with distinct encryption keys. In some examples, the types of encryption keys and other features used in connection with an asset access device 800 can include:

Tamper resistant secure processor 802: In some examples, the keying material (e.g., non-migratable keys 824 including a manufacturer's key pair 804 and certify key pair 806) and cryptographic processing occurs within a tamper resistant processor 802, including protected memory 822. Examples of such a processor include the TPM 1.2 hardware and the Intel SGX chip.

Processor-unique manufacturer's key pair 804: In some examples, the tamper resistant processor 802 contains a hardware-unique public key pair 804. This key is referred to as the manufacturer's encryption key (EK) and it is non-readable and non-exportable from the secure processor 802.

Processor-unique certify key pair 806: In some examples, the processor's manufacturer's encryption key 804 is used to generate a certify key pair 806, which is also non-exportable from the secure processor 802. The certify key pair 806 can be used to generate and sign a simple certificate data structure (e.g., certificate(s) 816) containing other keys (e.g., an instance key pair, display key pair, synchronization key pair, etc.). As indicated above, in some examples, the processor 802 and a board to which the processor is coupled can be manufactured by different entities and, in those examples, multiple certificates can be generated for each hardware element.

Instance key pair 808: In some examples, an instance key pair 808 is used to bind the asset access device 800 to a digital asset instance belonging to a corresponding asset owner. In some examples, the public key of the instance key pair 808 is provided to the asset issuer entity (e.g., the digital asset instance issuance service 502) when the asset access device 800 is registered by the owner to the issuance service 502.

Display key pair 810A and 810B: In some examples, a display key pair 810 is used to pair the asset access device 800 to a particular display screen 812 to which the asset access device is physically attached (e.g., bolted-on or built-in). In some examples, the display screen also has its own key pair that is paired with the asset access device and can be used, e.g., by the hardware to mate 1-to-1 to the display (and which can be optionally associated with a screen manufacturer issued certificate 818).

Synchronization key pair 812A and 812B: In some examples, a synchronization key pair 812A, 812B is used by the asset access device 800 to perform regular synchronizations with the digital asset instance issuer (e.g., the digital asset instance synchronization service 506). For example, the synchronization module 814 performs device attestation on a periodic basis by producing a data item conforming to a device attestation standard (e.g., the data item can include an attestation report providing an internal status of the tamper resistant processor 802 and/or the board to which the processor is coupled). In some examples, the synchronization module 814 can include firmware or software running on the asset access device 800.

6.2. Registration of Asset Access Device with a Digital Asset Instance Issuance Service As indicated herein, in some examples, the purchase mechanism for a digital asset instance (DAI) is via a corresponding digital asset token (DAT) on the blockchain. Once a digital asset instance has been transacted and the corresponding digital asset token is in possession of the new owner, in order to obtain access to the core asset (e.g., encrypted in the digital asset instance), in some examples, the new owner designates an asset access device (AAD) (see FIG. 8). In some examples, the designation of an asset access device involves the digital asset token owner registering the device and its relevant keys (e.g., an instance key pair 808) with the digital asset instance issuance service 502 and the digital asset instance regeneration service 506 (e.g., using an application programming interface (API) or other interface provided by the regeneration service).

During the registration phase of the digital asset instance issuance service 502 and digital asset instance regeneration service 504, in some examples, the asset access device owner registers a number of keys that have been generated onboard the asset access device. These keys include, for example, an instance key pair, a display key pair, and the synchronization key pair, as described elsewhere herein.

In some examples, when an asset access device owner obtains an asset via the blockchain (e.g., by purchasing a digital asset token for that asset), the regeneration service 504 is thus able to prepare the core asset in such a way that it is decipherable only by the designated asset access device of the digital asset token owner (e.g., by using the keys provided by the asset access device 800 during registration).

6.3. Protection of Core Asset for Delivery to Asset Access Device

When a digital asset instance (carrying the core asset) is to be created for a given asset access device, in some examples, the core asset is encrypted (e.g., by the digital asset instance issuance service) using the instance key pair mentioned previously. The encrypted core asset is then decipherable only by the private key of the instance key pair within the confines of the tamper-resistant processor of the asset access device.

As indicated herein, in some examples, it is desirable to disable an asset access device's access to a digital asset instance. For example, if the synchronization service 506 or other component of a digital asset issuance service determines that ownership of a digital asset instance has changed due to a purchase/sale of the digital asset instance as evidenced on the asset trading platform 102 or based on other conditions, the digital asset issuance service can update data stored by the service reflecting which asset access device is permitted to view/consume the digital asset instance.

As further indicated herein, an asset access device 800 includes a synchronization module 814 used to perform a periodic device attestation. In the case where the digital asset issuance service determines that an asset access device 800 is no longer permitted to view/consume a digital asset instance, the synchronization service 506 sends a message to the synchronization module 824 instructing the module to delete the associated encryption key(s) (e.g., the instance key pair 808, synchronization key pair 812A and 812B, etc.) used to decrypt the digital asset instance for viewing. The message can be sent to the synchronization module 814, for example, as part of a synchronization exchange between the asset access device and the synchronization service 506, or on an ad hoc basis. Upon receiving the instructions, in some examples, the synchronization module 814 performs some or all the following operations: deletes the encryption key(s) at the asset access device, deletes the digital asset instance, deletes the entire contents of protected memory 822, or otherwise disables access to the digital asset instance. In some examples, to ensure that a version of the synchronization module 814 running on an asset access device 800 is authorized by the digital asset issuance service, the tamper resistant process 802 can store a hash of synchronization module software, or a hash of an image of a virtual machine, container, or other execution environment used to execute the synchronization module, where the processor can use the hash to ensure that an authorized copy of the synchronization module 814 is present (e.g., by comparing a hash of the software before launch to the one stored on the processor).

7.0 Additional Examples

In some examples, a right of first purchase asset and smart contract logic provides a group of current holder of an asset instance the opportunity purchase/bid on the blockchain for an instance that is available for sale from the same group of holders.

In some examples, a digital asset token (DAT) is traded on the blockchain as a means to indicate legal ownership of a corresponding digital asset instance (DAI), which is stored off-chain. The digital asset instance is a non-fungible (non-divisible and unique) asset, which is created by a legal issuer entity based on an asset specification defined in a digital asset definition (DAD). One or several digital asset instances can be created by the issuer based on the specification rules in the DAD.

In some examples, the separation of the digital asset instance (off-chain) from the digital asset token (on-chain) provides enables: (a) the digital asset token to be traded on the blockchain by its current owner, (b) the history of the previous owners to be tracked on the blockchain all the way to the issuer of the digital asset instance, (c) the core asset to remain off-chain, encrypted, and therefore private to the holders of the digital asset instance.

In some examples, a mechanism is used for controlling and restricting the number of instances of a digital asset that can be consumed (e.g., viewed) at any one time. The mechanism can be implemented using trusted hardware that is under the control of the legal owner of the digital asset instance (off-chain).

In some examples, a mechanism is used to permit the issuer of the digital asset instance to wrap and encrypt the core asset inside a protected container that is decipherable only by a single intended asset access device (e.g., a digital asset instance wallet) under the authenticated control of the current legal owner of the digital asset instance.

In some examples, when the ownership of a digital asset instance changes (e.g., when an instance is sold to a new owner), the issuer disables access by the current owner and migrates the digital asset instance to the trusted hardware of the new owner using a secure asset migration protocol. The protocol ensures that only the intended asset access device (e.g., digital asset instance wallet) of the new owner can decipher the wrapped/encrypted digital asset instance.

In some examples, for each digital asset instance (issued by a legal issuer entity) to an owner (e.g., to the trusted hardware of the owner's the asset access device (digital asset instance wallet)), the issuer executes a key liveliness protocol with the trusted device. This key liveliness protocol includes device attestations by the trusted hardware, which reports the various system status of the asset access device (digital asset instance wallet).

In some examples, an asset access device (digital asset instance wallet) possesses an automatic asset shielding feature that locks the trusted hardware should the key liveliness protocol become unresponsive (e.g., fails to verify liveliness or attestations) for more than N number of seconds. The issuer determines the number N of seconds based on several parameters. These parameters can include: the class/family of asset (e.g., the value of asset), the number of outstanding digital asset instances (of that asset), the type of asset access device (e.g., digital asset instance wallet) being utilized by the owner, and so on.

FIG. 9 is a flow diagram illustrating operations 900 of a method for providing a digital asset instance to a trusted computing device associated with an entity that owns the digital asset instance according to some embodiments. Some or all of the operations 900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 900 are performed by an asset management provider service of the other figures.

The operations 900 include, at block 902, generating, by a digital asset instance issuance service, a digital asset instance according to a digital asset definition, wherein the digital asset instance includes a copy of a digital asset encrypted using an encryption key.

The operations 900 further include, at block 904, generating a digital asset token, wherein the digital asset token identifies an entity that owns the digital asset instance.

The operations 900 further include, at block 906, storing the digital asset token on a blockchain.

The operations 900 further include, at block 908, providing the digital asset instance and the encryption key to a trusted computing device associated with the entity that owns the digital asset instance.

In some embodiments, the operations further include generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

In some embodiments, the entity that owns the digital asset instance is a first entity, and wherein the operations further include: identifying, on the blockchain, a new digital asset token indicating that ownership has transferred from the first entity to a second entity; generating a new digital asset instance based on the digital asset, wherein the digital asset is encrypted using an encryption key associated with the second entity.

In some embodiments, the trusted computing device includes synchronization services that limit a number of instances of the digital asset that can be consumed at any given time.

In some embodiments, the encryption is specific to the trusted computing device.

In some embodiments, the operations further include upon detecting that ownership of the digital asset instance has transferred from the first entity to a second entity, disabling access by the first entity to the digital asset instance.

In some embodiments, the digital asset definition includes at least one of the following: a digital asset definition serial number, an identifier of a legal issuer entity that created the digital asset definition, a public key associated with the legal issuer entity, a serial number of the legal issuer entity's digital certificate, a description of the digital asset, a hash of the digital asset, a value indicating a number of permitted instances of the digital asset, a flag indicating whether the digital asset is to be encrypted, a right of first purchase indicator, an identifier of a witnessing party, a date of issuance of the digital asset definition, a digital signature of the legal issuer entity, or a digital signature of the witnessing party.

Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 10:
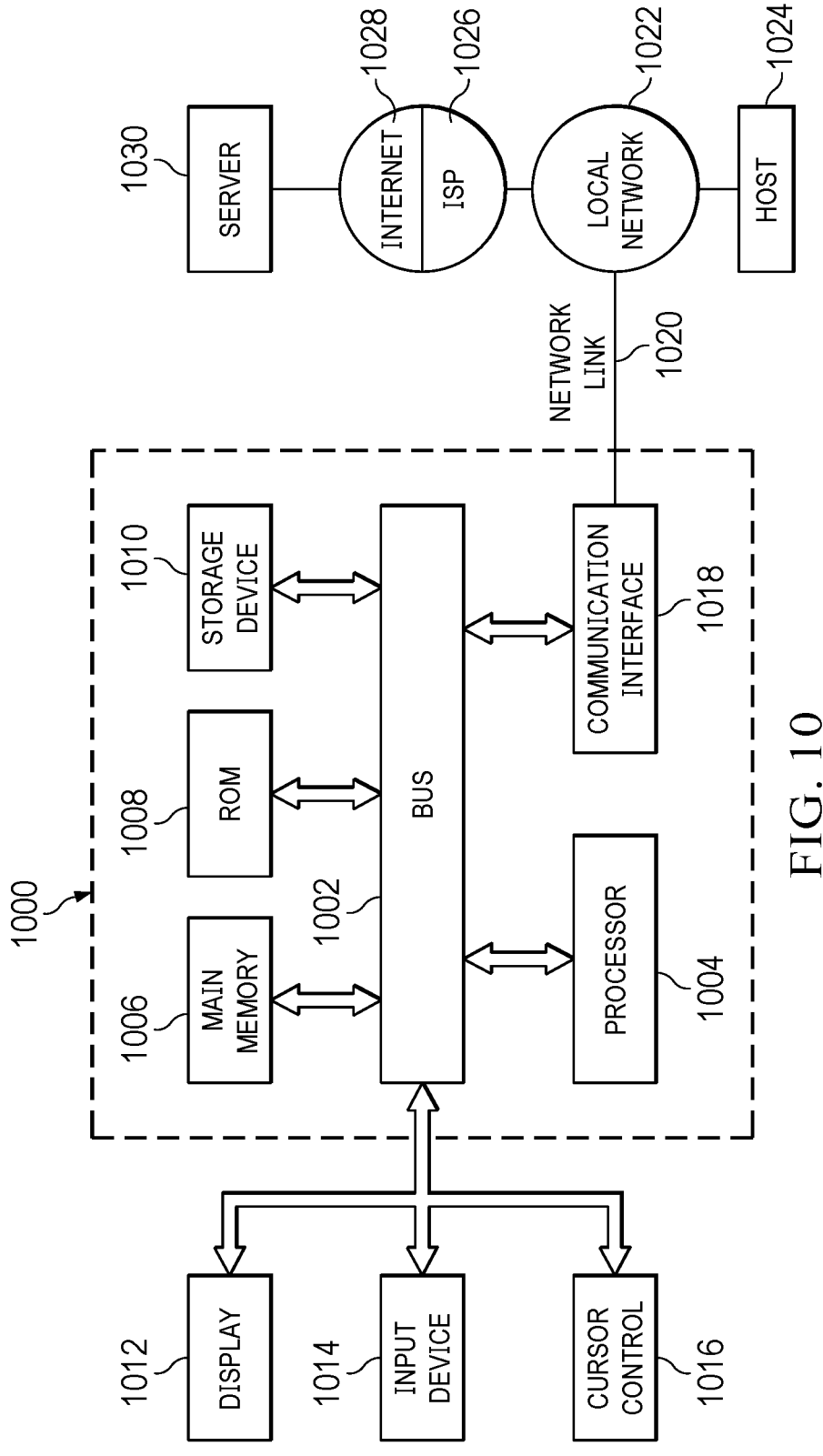
FIG. 10 is a block diagram illustrating an example computer system that may be used in some examples.

FIG. 10 is a block diagram that illustrates a computer system 1000 utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device.

Computer system 1000 includes one or more buses 1002 or other communication mechanism for communicating information, and one or more hardware processors 1004 coupled with buses 1002 for processing information. Hardware processors 1004 may be, for example, general purpose microprocessors. Buses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes a main memory 1006, such as a random access memory (RAM) or other dynamic or volatile storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 a special-purpose machine that is customized to perform the operations specified in the instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, is provided and coupled to bus 1002 for storing information and instructions.

Computer system 1000 may be coupled via bus 1002 to one or more displays 1012 for presenting information to a computer user. For instance, computer system 1000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

A computer system 1000 may implement techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 802.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In an embodiment, some or all of the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

At least some embodiments of the disclosed technologies can be described in view of the following clauses:

1. A computer-implemented method comprising:

generating, by a digital asset instance issuance service, a digital asset instance according to a digital asset definition, wherein the digital asset instance includes a copy of a digital asset encrypted using an encryption key;

generating a digital asset token, wherein the digital asset token identifies an entity that owns the digital asset instance;

storing the digital asset token on a blockchain; and providing the digital asset instance and the encryption key to a trusted computing device associated with the entity that owns the digital asset instance.

2. The computer-implemented method of clause 1, further comprising:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

3. The computer-implemented method of any one of clauses 1-2, wherein the entity that owns the digital asset instance is a first entity, and wherein the method further comprises:

identifying, on the blockchain, a new digital asset token indicating that ownership has transferred from the first entity to a second entity; and generating a new digital asset instance based on the digital asset, wherein the digital asset is encrypted using an encryption key associated with the second entity.

4. The computer-implemented method of any one of clauses 1-3, wherein the trusted computing device includes synchronization services that limit a number of instances of the digital asset that can be consumed at any given time.

5. The computer-implemented method of any one of clauses 1-4, wherein the encryption key is specific to the trusted computing device.

6. The computer-implemented method of any one of clauses 1-5, wherein the entity is a first entity, and wherein the method further comprises, upon detecting that ownership of the digital asset instance has transferred from the first entity to a second entity, disabling access by the first entity to the digital asset instance.

7. The computer-implemented method of any one of clauses 1-6, wherein the digital asset definition includes at least one of:

a digital asset definition serial number, an identifier of a legal issuer entity that created the digital asset definition, a public key associated with the legal issuer entity, a serial number of the legal issuer entity's digital certificate, a description of the digital asset, a hash of the digital asset, a value indicating a number of permitted instances of the digital asset, a flag indicating whether the digital asset is to be encrypted, a right of first purchase indicator, an identifier of a witnessing party, a date of issuance of the digital asset definition, a digital signature of the legal issuer entity, or a digital signature of the witnessing party.

8. A system comprising:

an asset management provider service implemented by a first one or more electronic devices comprising a processor, the asset management provider service including instructions that upon execution cause the asset management provider service to:

generate, by a digital asset instance issuance service of the asset management provider, a digital asset instance according to a digital asset definition, wherein the digital asset instance includes a copy of a digital asset encrypted using an encryption key, generate a digital asset token, wherein the digital asset token identifies an entity that owns the digital asset instance, store the digital asset token on a blockchain, and provide the digital asset instance and the encryption key to a trusted computing device associated with the entity that owns the digital asset instance; and a trusted computing device implemented by a second one or more electronic devices comprising a processor, the trusted computing device including instructions that upon execution cause the trusted computing device to:

store the digital asset instance in a digital asset instance wallet, and access the digital asset instance using the encryption key.

9. The system of clause 8, wherein the instructions, upon execution, further cause the asset management provider service to:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

10. The system of any one of clauses 8-9, wherein the entity that owns the digital asset instance is a first entity, and wherein the instructions, upon execution, further cause the asset management provider service to:

identifying, on the blockchain, a new digital asset token indicating that ownership has transferred from the first entity to a second entity; and generating a new digital asset instance based on the digital asset, wherein the digital asset is encrypted using an encryption key associated with the second entity.

11. The system of any one of clauses 8-10, wherein the trusted computing device includes synchronization services that limit a number of instances of the digital asset that can be consumed at any given time.

12. The system of any one of clauses 8-11, wherein the encryption key is specific to the trusted computing device.

13. The system of any one of clauses 8-12, wherein the entity is a first entity, and wherein the instructions, upon execution, further cause the asset management provider service to, upon detecting that ownership of the digital asset instance has transferred from the first entity to a second entity, disabling access by the first entity to the digital asset instance.

14. The system of any one of clauses 8-13, wherein the digital asset definition includes at least one of:

a digital asset definition serial number, an identifier of a legal issuer entity that created the digital asset definition, a public key associated with the legal issuer entity, a serial number of the legal issuer entity's digital certificate, a description of the digital asset, a hash of the digital asset, a value indicating a number of permitted instances of the digital asset, a flag indicating whether the digital asset is to be encrypted, a right of first purchase indicator, an identifier of a witnessing party, a date of issuance of the digital asset definition, a digital signature of the legal issuer entity, or a digital signature of the witnessing party.

15. A non-transitory computer-readable storage medium storing instructions which, when executed by one or more processors, cause performance of:

generating, by a digital asset instance issuance service, a digital asset instance according to a digital asset definition, wherein the digital asset instance includes a copy of a digital asset encrypted using an encryption key;

generating a digital asset token, wherein the digital asset token identifies an entity that owns the digital asset instance;

storing the digital asset token on a blockchain; and providing the digital asset instance and the encryption key to a trusted computing device associated with the entity that owns the digital asset instance.

16. The non-transitory computer-readable storage medium of clause 15, wherein the instructions, when executed by the one or more processors, further causes the performance of:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

17. The non-transitory computer-readable storage medium of any one of clauses 15-16, wherein the entity that owns the digital asset instance is a first entity, and wherein the instructions, when executed by the one or more processors, further causes the performance of:

identifying, on the blockchain, a new digital asset token indicating that ownership has transferred from the first entity to a second entity; and generating a new digital asset instance based on the digital asset, wherein the digital asset is encrypted using an encryption key associated with the second entity.

18. The non-transitory computer-readable storage medium of any one of clauses 15-17, wherein the trusted computing device includes synchronization services that limit a number of instances of the digital asset that can be consumed at any given time.

19. The non-transitory computer-readable storage medium of any one of clauses 15-18, wherein the encryption key is specific to the trusted computing device.

20. The non-transitory computer-readable storage medium of any one of clauses 15-19, wherein the entity is a first entity, and wherein the instructions, when executed by the one or more processors, further cause the performance of: upon detecting that ownership of the digital asset instance has transferred from the first entity to a second entity, disabling access by the first entity to the digital asset instance.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

generating, by a digital asset instance issuance service, a digital asset instance according to a digital asset definition, wherein the digital asset instance includes a copy of a digital asset encrypted using an encryption key;

generating a digital asset token, wherein the digital asset token identifies a first entity that owns the digital asset instance;

storing the digital asset token on a blockchain;

providing the digital asset instance and the encryption key to a trusted computing device associated with the first entity that owns the digital asset instance;

identifying, on the blockchain, by a transaction scanning daemon process, a new digital asset token indicating ownership of the digital asset has transferred from the first entity to a second entity; and triggering, by the transaction scanning daemon process in response to the identifying of the new digital asset token on the blockchain, generation of a new digital asset instance based on the digital asset, wherein the digital asset is encrypted using an encryption key associated with the second entity.

2. The computer-implemented method of claim 1, further comprising:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

3. The computer-implemented method of claim 1, wherein the transaction scanning daemon process is implemented by a digital asset instance regeneration service, and wherein generation of the new digital asset instance is performed by the digital asset instance regeneration service.

4. The computer-implemented method of claim 1, wherein the trusted computing device includes synchronization services that limit a number of instances of the digital asset that can be consumed at any given time.

5. The computer-implemented method of claim 1, wherein the encryption key is specific to the trusted computing device.

6. The computer-implemented method of claim 1, wherein the entity is a first entity, and wherein the method further comprises, upon detecting that ownership of the digital asset instance has transferred from the first entity to a second entity, disabling access by the first entity to the digital asset instance.

7. The computer-implemented method of claim 1, wherein the digital asset definition includes at least one of:

a digital asset definition serial number, an identifier of a legal issuer entity that created the digital asset definition, a public key associated with the legal issuer entity, a serial number of the legal issuer entity's digital certificate, a description of the digital asset, a hash of the digital asset, a value indicating a number of permitted instances of the digital asset, a flag indicating whether the digital asset is to be encrypted, a right of first purchase indicator, an identifier of a witnessing party, a date of issuance of the digital asset definition, a digital signature of the legal issuer entity, or a digital signature of the witnessing party.

8. A system comprising:

an asset management provider service implemented by a first one or more electronic devices comprising a processor, the asset management provider service including instructions that upon execution cause the asset management provider service to:

generate, by a digital asset instance issuance service of the asset management provider, a digital asset instance according to a digital asset definition, wherein the digital asset instance includes a copy of a digital asset encrypted using an encryption key, generate a digital asset token, wherein the digital asset token identifies a first entity that owns the digital asset instance, store the digital asset token on a blockchain, provide the digital asset instance and the encryption key to a trusted computing device associated with the first entity that owns the digital asset instance, identify, on the blockchain, by a transaction scanning daemon process, a new digital asset token indicating ownership of the digital asset has transferred from the first entity to a second entity, and trigger, by the transaction scanning daemon process in response to the identifying of the new digital asset token on the blockchain, generation of a new digital asset instance based on the digital asset, wherein the digital asset is encrypted using an encryption key associated with the second entity; and the trusted computing device implemented by a second one or more electronic devices comprising a processor, the trusted computing device including instructions that upon execution cause the trusted computing device to:

store the digital asset instance in a digital asset instance wallet, and access the digital asset instance using the encryption key.

9. The system of claim 8, wherein the instructions, upon execution, further cause the asset management provider service to:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

10. The system of claim 8, wherein the transaction scanning daemon process is implemented by a digital asset instance regeneration service, and wherein generation of the new digital asset instance is performed by the digital asset instance regeneration service.

11. The system of claim 8, wherein the trusted computing device includes synchronization services that limit a number of instances of the digital asset that can be consumed at any given time.

12. The system of claim 8, wherein the encryption key is specific to the trusted computing device.

13. The system of claim 8, wherein the entity is a first entity, and wherein the instructions, upon execution, further cause the asset management provider service to, upon detecting that ownership of the digital asset instance has transferred from the first entity to a second entity, disabling access by the first entity to the digital asset instance.

14. The system of claim 8, wherein the digital asset definition includes at least one of:

a digital asset definition serial number, an identifier of a legal issuer entity that created the digital asset definition, a public key associated with the legal issuer entity, a serial number of the legal issuer entity's digital certificate, a description of the digital asset, a hash of the digital asset, a value indicating a number of permitted instances of the digital asset, a flag indicating whether the digital asset is to be encrypted, a right of first purchase indicator, an identifier of a witnessing party, a date of issuance of the digital asset definition, a digital signature of the legal issuer entity, or a digital signature of the witnessing party.

15. A non-transitory computer-readable storage medium storing instructions which, when executed by one or more processors, cause performance of:

generating, by a digital asset instance issuance service, a digital asset instance according to a digital asset definition, wherein the digital asset instance includes a copy of a digital asset encrypted using an encryption key;

generating a digital asset token, wherein the digital asset token identifies a first entity that owns the digital asset instance;

storing the digital asset token on a blockchain;

providing the digital asset instance and the encryption key to a trusted computing device associated with the first entity that owns the digital asset instance;

identifying, on the blockchain, by a transaction scanning daemon process, a new digital asset token indicating ownership of the digital asset has transferred from the first entity to a second entity; and triggering, by the transaction scanning daemon process in response to the identifying of the new digital asset token on the blockchain, generation of a new digital asset instance based on the digital asset, wherein the digital asset is encrypted using an encryption key associated with the second entity.

16. The non-transitory computer-readable storage medium of claim 15, wherein the instructions, when executed by the one or more processors, further causes the performance of:

generating, by the digital asset instance issuance service, a plurality of digital asset instances according to the digital asset definition, wherein each digital asset instance of the plurality of digital asset instances is encrypted using a respective encryption key, wherein each digital asset instance of the plurality of digital asset instances is associated with a respective generation identifier, and wherein each of the plurality of digital asset instances is identified by a respective digital asset instance serial number; and storing the plurality of digital asset instances in a data store.

17. The non-transitory computer-readable storage medium of claim 15, wherein the transaction scanning daemon process is implemented by a digital asset instance regeneration service, and wherein generation of the new digital asset instance is performed by the digital asset instance regeneration service.

18. The non-transitory computer-readable storage medium of claim 15, wherein the trusted computing device includes synchronization services that limit a number of instances of the digital asset that can be consumed at any given time.

19. The non-transitory computer-readable storage medium of claim 15, wherein the encryption key is specific to the trusted computing device.

20. The non-transitory computer-readable storage medium of claim 15, wherein the entity is a first entity, and wherein the instructions, when executed by the one or more processors, further cause the performance of: upon detecting that ownership of the digital asset instance has transferred from the first entity to a second entity, disabling access by the first entity to the digital asset instance.

* * * * *